(12) United States Patent
Shima et al.

(10) Patent No.: US 8,670,724 B2
(45) Date of Patent: Mar. 11, 2014

(54) WIRELESS COMMUNICATION TERMINAL, CONTROL METHOD THEREFOR, AND INFORMATION STORAGE MEDIUM

(75) Inventors: Koji Shima, Kanagawa (JP); Yasutaka Miwa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 86 days.

(21) Appl. No.: 13/392,139

(22) PCT Filed: Aug. 13, 2010

(86) PCT No.: PCT/JP2010/063759
§ 371 (c)(1),
(2), (4) Date: Apr. 23, 2012

(87) PCT Pub. No.: WO2011/024656
PCT Pub. Date: Mar. 3, 2011

(65) Prior Publication Data
US 2012/0208471 A1  Aug. 16, 2012

(30) Foreign Application Priority Data
Aug. 31, 2009 (JP) ................. 2009-199255

(51) Int. Cl.
*H04B 1/00* (2006.01)
(52) U.S. Cl.
USPC ................. 455/68; 455/69; 455/574
(58) Field of Classification Search
USPC .......................................... 455/68
See application file for complete search history.

(56) References Cited

U.S. PATENT DOCUMENTS 5,113,499 A * 5/1992 Ankney et al. ............... 340/5.74
2005/0233704 A1 * 10/2005 Maekawa ..................... 455/69

FOREIGN PATENT DOCUMENTS

JP        2004164566 A       6/2004

OTHER PUBLICATIONS

International Search Report for corresponding PCT Application No. PCT/JP2010/063759, dated Nov. 16, 2010.
International Search Preliminary Report on Patent Ability and Written Opinion for corresponding PCT Application No. PCT/JP2010/063759, dated Mar. 22, 2012.

* cited by examiner

*Primary Examiner* — Ajibola Akinyemi
(74) *Attorney, Agent, or Firm* — Matthew B. Dernier, Esq.; Gibson & Dernier LLP

(57) ABSTRACT

Provided is a wireless communication terminal that allows a wireless communication connection to be disconnected even when an application program that requires continuation of the communication connection is being executed. The wireless communication terminal transmits data to a communication target in response to a transmission processing request from an application execution section for executing the application program. The wireless communication terminal is configured to: establish the wireless communication connection to the communication target; disconnect, based on a given condition, the wireless communication connection to the communication target to cause a shift to a communication interrupted state; re-establish the wireless communication connection to the communication target when the transmission processing request is received in the communication interrupted state from the application execution section; and transmit, to the communication target, the data relating to the transmission processing request after the re-establishment of the wireless communication connection.

8 Claims, 5 Drawing Sheets

WIRELESS COMMUNICATION TERMINAL, CONTROL METHOD THEREFOR, AND INFORMATION STORAGE MEDIUM

TECHNICAL FIELD

The present invention relates to a wireless communication terminal for performing communication with another communication device by wireless. The present invention also relates to a control method for the wireless communication terminal and an information storage medium.

BACKGROUND ART

There have been widely used various kinds of wireless communication terminals for performing wireless communication with another communication device. For those wireless communication terminals, there has been a demand that power consumption thereof be reduced. To address this, there is proposed a technology of suppressing power consumption by causing the wireless communication terminal to shift to a sleep state in a period in which data communication is not performed (for example, see Patent Literature 1).

CITATION LIST

Patent Literature

[Patent Literature 1] US 2005/0233704 A1

SUMMARY OF INVENTION

In the above-mentioned example, even in the period in which the wireless communication terminal is in the sleep state, part of a communication interface operates to maintain a wireless communication connection. This is because, if such control is not performed, the communication connection is disconnected at the time of shifting to the sleep state, thereby causing a fear in that an application program that requires continuation of the communication connection does not operate normally. However, if the wireless communication connection is maintained, power may be consumed because of the transmission of a control packet, such as a beacon, even when the application program side does not require the transmission/reception of data.

The present invention has been made in view of the above-mentioned circumstances, and therefore has an object to provide a wireless communication terminal that allows a wireless communication connection to be disconnected even when an application program that requires continuation of the communication connection is being executed, and also to provide a control method for the wireless communication terminal and an information storage medium.

The present invention provides a wireless communication terminal, including: an application execution section for executing an application program; and a communication control section for transmitting data to a communication target in response to a transmission processing request from the application execution section, in which the communication control section includes: a connection section for establishing a wireless communication connection to the communication target; a communication interruption section for disconnecting, based on a given condition, the wireless communication connection to the communication target to cause a shift to a communication interrupted state; a reconnection section for re-establishing the wireless communication connection to the communication target when the transmission processing request is received in the communication interrupted state; and a data transmission section for transmitting, to the communication target, the data relating to the transmission processing request after the re-establishment of the wireless communication connection.

Further, the present invention provides a control method for a wireless communication terminal that transmits data to a communication target in response to a transmission processing request from an application execution section for executing an application program, the control method for a wireless communication terminal including: establishing a wireless communication connection to the communication target; disconnecting, based on a given condition, the wireless communication connection to the communication target to cause a shift to a communication interrupted state; re-establishing the wireless communication connection to the communication target when the transmission processing request is received in the communication interrupted state; and transmitting, to the communication target, the data relating to the transmission processing request after the re-establishment of the wireless communication connection.

Further, the present invention provides a computer-readable information storage medium having a program stored therein, the program being used for controlling a wireless communication terminal that transmits data to a communication target in response to a transmission processing request from an application execution section for executing an application program, and causing the wireless communication terminal to function as: a connection section for establishing a wireless communication connection to the communication target; a communication interruption section for disconnecting, based on a given condition, the wireless communication connection to the communication target to cause a shift to a communication interrupted state; a reconnection section for re-establishing the wireless communication connection to the communication target when the transmission processing request is received in the communication interrupted state; and a data transmission section for transmitting, to the communication target, the data relating to the transmission processing request after the re-establishment of the wireless communication connection.

DESCRIPTION OF EMBODIMENTS

Hereinbelow, an embodiment of the present invention is described in detail with reference to the drawings.

Figure 1:
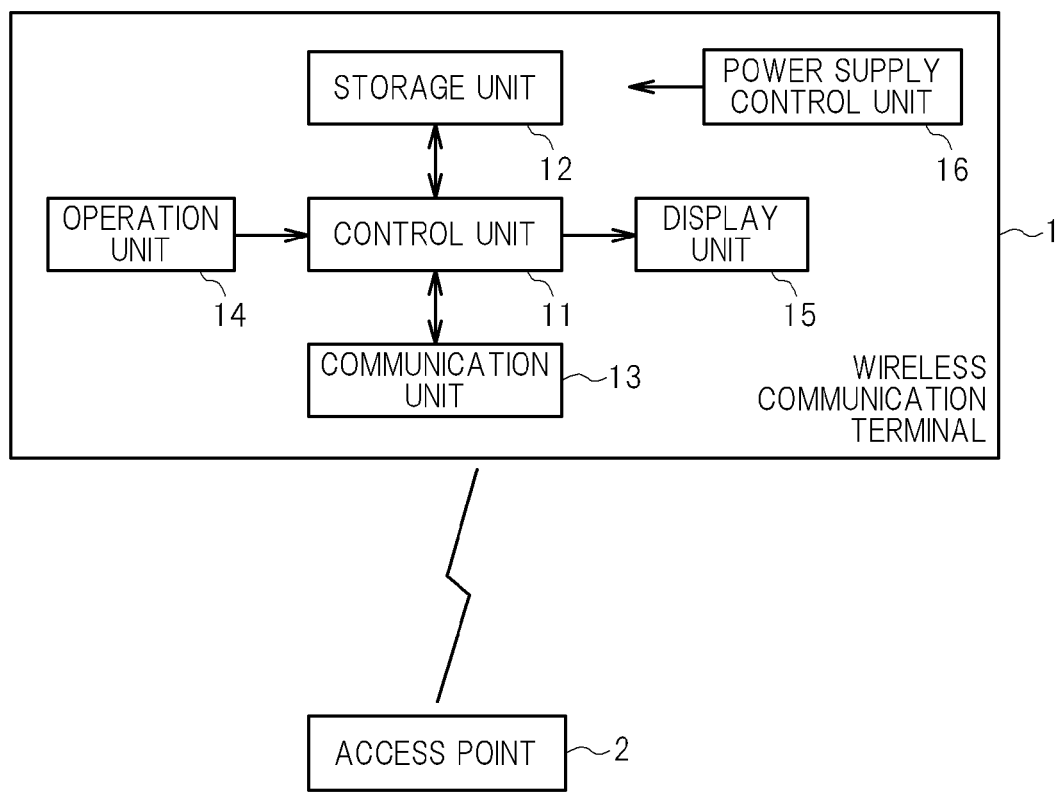
[FIG. 1] A configuration diagram of a wireless communication terminal according to an embodiment of the present invention.

FIG. 1 is a configuration diagram of a wireless communication terminal 1 according to the embodiment of the present invention. The wireless communication terminal 1 is such a communication terminal that is carried along by a user for use and transmits/receives data to/from another communication device by wireless, and may be, for example, a portable game machine or a personal digital assistant. A communication target of the wireless communication terminal 1 may be the same kind of mobile device as the wireless communication terminal 1, or may be an access point or the like. Hereinbelow, as an example, description is given of a case in which the communication target of the wireless communication terminal 1 is an access point 2 as illustrated in FIG. 1. As illustrated in FIG. 1, the wireless communication terminal 1 includes a control unit 11, a storage unit 12, a communication unit 13, an operation unit 14, a display unit 15, and a power supply control unit 16.

The control unit 11 includes a CPU and the like, and executes various kinds of information processing in accordance with programs stored in the storage unit 12. The details of the processing executed by the control unit 11 are given later.

The storage unit 12 includes a memory device such as a RAM or a ROM, and stores the programs executed by the control unit 11 and various kinds of data. Further, the storage unit 12 also functions as a working memory for the control unit 11.

The communication unit 13 is a communication interface for transmitting/receiving data by wireless, and, in this embodiment, is a wireless communication module for performing wireless LAN communication with the access point 2 in accordance with the IEEE 802.11 standards.

The operation unit 14 is such an operation member as a button, and receives an operation input from the user and outputs a signal indicating a content thereof to the control unit 11. The display unit 15 is, for example, a liquid crystal display, and displays various kinds of images in accordance with instructions from the control unit 11.

The power supply control unit 16 is, for example, a power supply control circuit, and supplies power supplied from a rechargeable battery built into the wireless communication terminal 1 to each unit of the wireless communication terminal 1. Further, the power supply control unit 16 outputs information on a power supply state or the like to the control unit 11.

Figure 2:
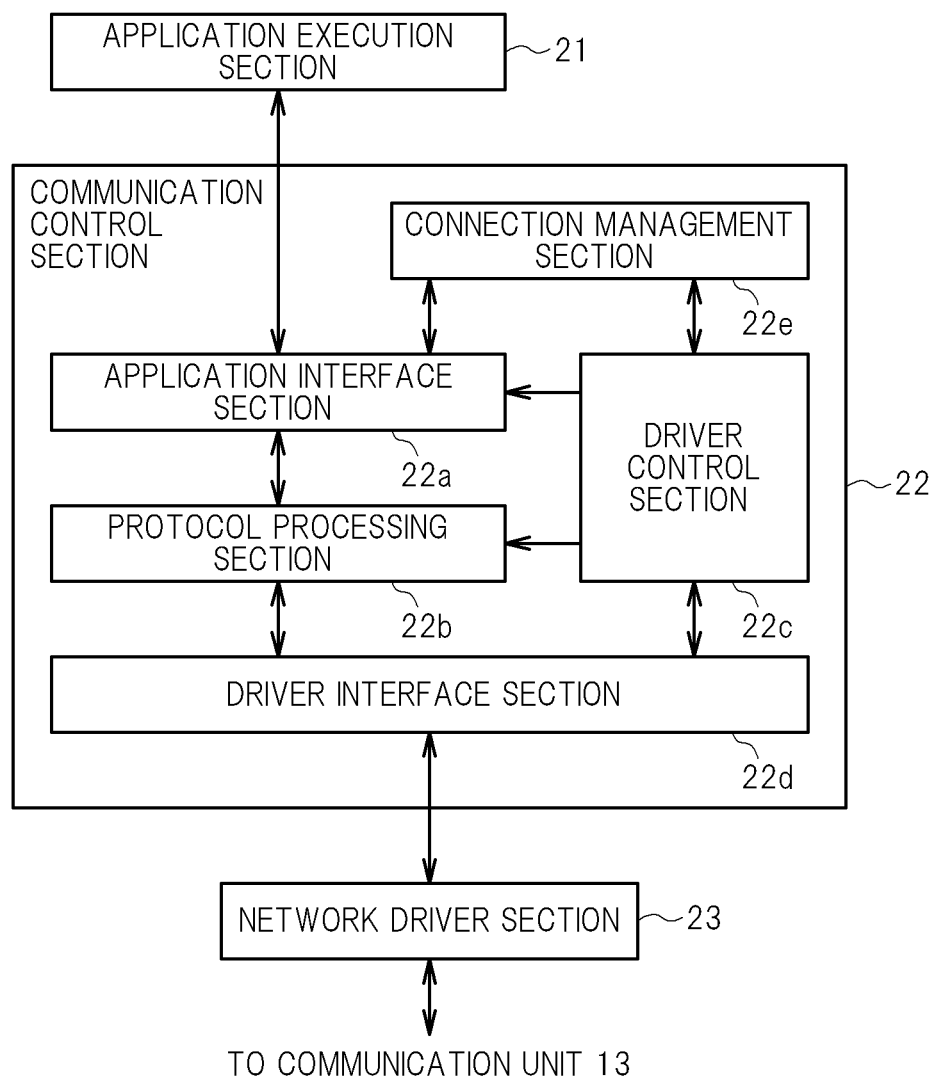
[FIG. 2] A functional block diagram illustrating functions implemented by the wireless communication terminal according to the embodiment of the present invention.

FIG. 2 is a functional block diagram illustrating functions implemented by the wireless communication terminal 1. As illustrated in the figure, the wireless communication terminal 1 functionally includes an application execution section 21, a communication control section 22, and a network driver section 23. Further, the communication control section 22 includes an application interface section 22a, a protocol processing section 22b, a driver control section 22c, a driver interface section 22d, and a connection management section 22e. Those functions are implemented by the control unit 11 executing programs corresponding to the respective functions. Specifically, the application execution section 21 is implemented by the control unit 11 executing an application program. Each function of the communication control section 22 is implemented by the control unit 11 executing a program for communication control. The network driver section 23 is implemented by the control unit 11 executing a network driver program. Those programs are stored in the storage unit 12 and executed by the control unit 11. Further, those programs may be provided to the wireless communication terminal 1 by being stored in various kinds of computer-readable information storage media such as an optical disc medium, or may be provided via a communication network such as the Internet.

The application execution section 21 executes processing defined by the application program. Here, the application execution section 21 executes processing involving data transmission to the access point 2. To give a specific example, the application execution section 21 may execute a WWW browser program to provide a webpage browsing function to the user. In this case, the application execution section 21 issues a webpage acquisition request to a WWW server specified by the user. This request is processed by the communication control section 22, and then transmitted to the access point 2 as a communication packet.

The communication control section 22 executes various kinds of processing regarding control of the data communication. Specifically, the communication control section 22 performs data transmission processing with respect to another communication device in response to a transmission processing request issued by the application execution section 21, processing of receiving data arriving from another communication device via the network driver section 23, and various kinds of control necessary for data transmission/reception.

The network driver section 23 directly controls the communication interface at the physical layer to transmit/receive a signal. In this embodiment, the network driver section 23 performs the wireless LAN communication by controlling the communication unit 13. Note that, in a case where the wireless communication terminal 1 includes, in addition to the wireless LAN, a plurality of communication interfaces such as LAN communication using USB connection, a device driver program is separately prepared for each of the communication interfaces. The control unit 11 executes the respective device driver programs to cause a plurality of network driver sections 23 corresponding to the respective communication interfaces to function.

Hereinbelow, description is given of the functions implemented in the communication control section 22.

The application interface section 22a is, for example, a socket application program interface (API), and functions as an interface for communication processing when viewed from the application execution section 21. Specifically, the application execution section 21 specifies a socket and issues a communication request to the application interface section 22a, to thereby perform data communication with an outside. In this case, the socket corresponds to an abstract communication port when viewed from the application execution section 21. By issuing the communication request to the socket, the application program can exchange data with a server, which is a connection destination at an upper layer, without giving consideration to the communication interface or a communication path at a lower layer.

The application execution section 21 issues various kinds of communication requests to the application interface section 22a, and examples of the communication requests (transmission processing request) that require the data transmission to the access point 2 include an application connection request (connect function) and an application data transmission request (send function). Note that, a connection realized here by the application connection request is different from a communication connection at the physical layer between the wireless communication terminal 1 and the access point 2, and is a connection at an upper layer (application layer) between the application execution section 21 and an application program executed by the server that is a final data transmission destination. In response to the content of the communication request received from the application execution section 21, the application interface section 22a gives an instruction for the communication processing to the protocol processing section 22b.

The protocol processing section 22b is implemented by various kinds of protocol modules constituting a protocol stack, and performs, for example, generation of a transmission packet and flow control on the data communication in accordance with a particular communication protocol. In this embodiment, the protocol processing section 22b performs the processing of data transmission/reception in accordance with various kinds of protocols constituting a TCP/IP protocol suite.

Separately from the content of the processing performed by the protocol processing section 22b, the driver control section 22c outputs various kinds of control commands for controlling the communication interface at the physical layer (in this embodiment, the communication unit 13). The control command is output to the corresponding network driver section 23 via the driver interface section 22d.

The driver interface section 22d relays data between the protocol processing section 22b or the driver control section 22c and the network driver section 23. In a case where the plurality of network driver sections 23 operate, the driver interface section 22d transfers, in response to a processing request from the protocol processing section 22b or the driver control section 22c, the processing request to the network driver section 23 that corresponds to that request. Further, in response to a notification from each network driver section 23, the driver interface section 22d outputs a data content received from another communication device to the protocol processing section 22b.

The connection management section 22e controls establishment and disconnection of the communication connection to another communication device at the physical layer. Specifically, in response to a request or the like from the user, the connection management section 22e instructs the driver control section 22c to establish a communication connection to the access point 2. In response thereto, the driver control section 22c establishes a communication connection between the communication unit 13 and the access point 2 via the driver interface section 22d. After the communication connection is established to the access point 2, a network address (in this case, IP address) is assigned from the access point 2. Note that, in this embodiment, the access point 2 assigns the network address, but the wireless communication terminal 1 may hold unique network address information in advance. In this case, a communication connection can be established by exchanging network addresses between the wireless communication terminal 1 and the access point 2.

Further, the connection management section 22e manages a communication connection status of the wireless communication terminal 1. Specifically, the connection management section 22e manages whether or not a communication connection is established to another communication device by the communication unit 13, and also, in a case where a communication connection is established, acquires and manages various kinds of information on the communication connection. Examples of the information to be managed include setting information, such as the network address assigned to the wireless communication terminal 1 itself and a net mask, and information on a communication state, such as the radio field intensity of the wireless communication.

Figure 3:
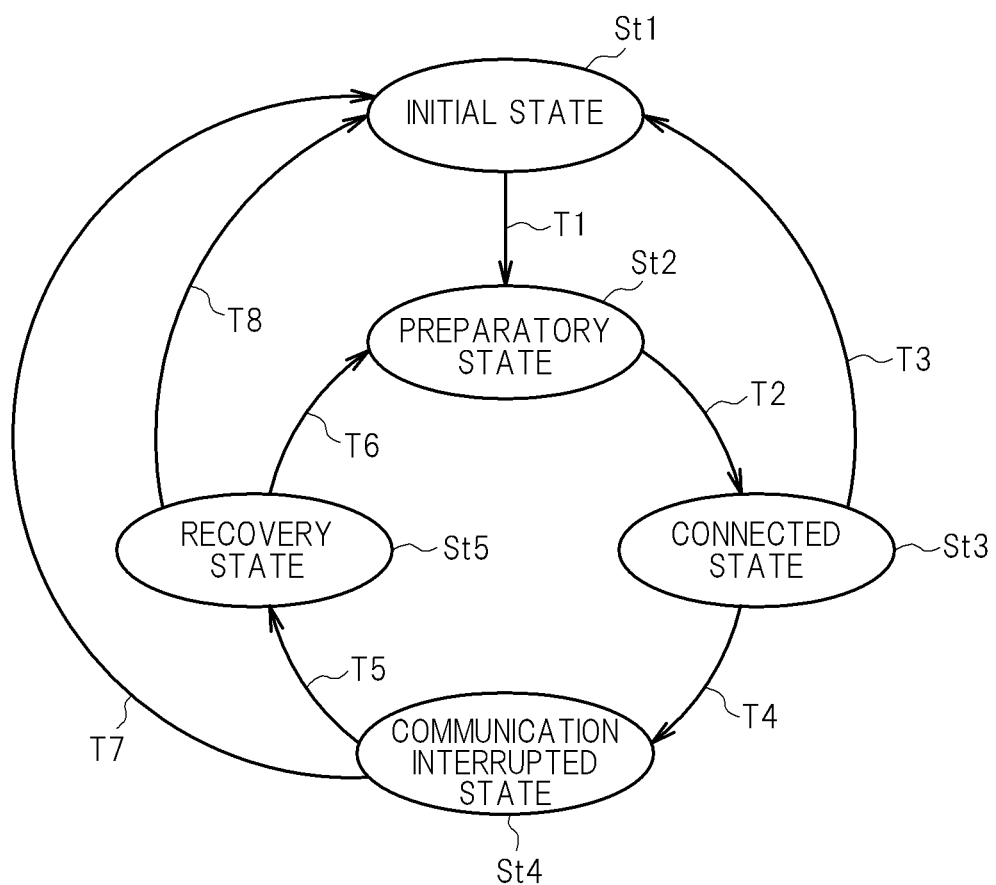
[FIG. 3] A state transition diagram of the wireless communication terminal according to the embodiment of the present invention.

Next, with reference to a state transition diagram of FIG. 3, description is given of state transition of the wireless communication terminal 1 in this embodiment. In an initial state St1, a communication connection is not established to the access point 2, and hence the wireless communication terminal 1 is not in a state of being able to perform communication. Here, in response to an instruction operation or the like performed on the operation unit 14 by the user, the connection management section 22e establishes a communication connection to the access point 2. With this, the network address is acquired, and the wireless communication terminal 1 shifts to a preparatory state St2 (transition T1).

In the preparatory state St2, the communication control section 22 determines whether or not there is any unprocessed data in a queue for unprocessed data described below, and, in a case where there exists unprocessed data, executes processing therefor. After the completion of the processing with a result that the queue for unprocessed data is empty, the wireless communication terminal 1 shifts to a connected state St3 (transition T2). In the connected state St3, when an instruction operation for terminating the communication connection is received from the user, the connection management section 22e performs processing of disconnecting the communication connection to the access point 2. With this, the network address assigned from the access point 2 is released, and the wireless communication terminal 1 returns to the initial state St1 (transition T3).

On the other hand, in the connected state St3, when a predetermined condition is satisfied, the connection management section 22e disconnects the communication connection to the access point 2, and then, the wireless communication terminal 1 shifts to a communication interrupted state St4 (transition T4). In this case, too, the network address assigned from the access point 2 is released. However, unlike the case of the transition T3, in the case of the transition T4, the socket and the connection at the upper layer, which are used by the application execution section 21, are maintained even after the transition. Alternatively, in a case where the socket is released through the transition T4, the socket is acquired again at the time of subsequently shifting to a recovery state St5. In this case, too, the operation of the application execution section 21 can be continued in the communication interrupted state St4. In other words, even if the wireless communication terminal 1 shifts from the connected state St3 to the communication interrupted state St4, processing that is being executed by the application execution section 21 is not affected.

Here, the condition that allows the shift from the connected state St3 to the communication interrupted state St4 may be, for example, such a condition that relates to an interval of communication with the access point 2 or the state of charge of the rechargeable battery. Specific examples of the condition include a case where the transmission/reception of data is not performed for a predetermined period of time (for example, 60 seconds) with the access point 2 and a case where the remaining charge of the rechargeable battery has fallen below a certain value. Specifically, the driver interface section 22d herein determines whether or not the shift to the communication interrupted state St4 is to be performed. In the case where the wireless communication terminal 1 transmits/receives data to/from the access point 2, the data is always exchanged via the driver interface section 22d. Accordingly, if the driver interface section 22d is configured to perform such determination, it is possible to accurately detect that the data transmission/reception has not been performed with the access point 2 for the predetermined period of time. Further, the driver interface section 22d may acquire information on the state of the rechargeable battery from the power supply control unit 16 to determine whether or not the state shift is to be performed based on the acquired information.

When it is determined that the shift to the communication interrupted state St4 is to be performed, the driver interface section 22*d* issues an event requesting the interruption of the communication connection. After detecting the event, the connection management section 22*e* disconnects the communication connection to the access point 2, and releases the network address. Specifically, in response to the request from the connection management section 22*e*, the driver control section 22*c* outputs a control command for giving an instruction for communication disconnection to the network driver section 23, and then, the communication is disconnected. With this, in the communication interrupted state St4, the transmission of an unnecessary beacon or the like ceases to be performed by the communication unit 13, and hence power consumption of the wireless communication terminal 1 can be suppressed.

In the communication interrupted state St4, when the transmission processing request has been made from the application execution section 21, the wireless communication terminal 1 shifts from the communication interrupted state St4 to the recovery state St5 (transition T5). Specifically, in response to the request from the application interface section 22*a* that has received the transmission processing request from the application execution section 21, the connection management section 22*e* executes re-establishment of the communication connection to the access point 2. The procedure of the reconnection may be the same as a communication connection establishment procedure initially executed by the connection management section 22*e* at the time of shifting from the initial state St1 to the preparatory state St2, and may include such processing as the assignment of the network address and authentication. After the completion of the reconnection processing, a network address is acquired, and the wireless communication terminal 1 shifts from the recovery state St5 to the preparatory state St2 (transition T6). Note that, there is no guarantee that the network address acquired on this occasion is the same as the network address assigned before the shift to the communication interrupted state St4. However, as described above, the operation of the application execution section 21 is maintained even in the communication interrupted state St4, and hence such a change in network setting does not affect the processing executed by the application execution section 21.

After the shift to the preparatory state St2, the communication control section 22 executes processing of transmitting data relating to the transmission processing request that has caused the transition T5. After the completion of this processing, the wireless communication terminal 1 returns to the connected state St3 again.

Note that, in both the communication interrupted state St4 and the recovery state St5, similarly to the case of the connected state St3, the communication connection to the access point 2 may be fully disconnected by an instruction or the like from the user, thereby causing the shift to the initial state St1 (transitions T7 and T8). However, in this case, the network address has already been released in the transition T4, and hence the release of the network address is not performed again unlike the case of the transition T3.

Next, description is given of a specific example of processing executed by the communication control section 22 when the shift is made from the communication interrupted state St4 to the connected state St3 via the recovery state St5 and the preparatory state St2 (recovery processing from the communication interrupted state St4).

In this embodiment, the application execution section 2*l* makes the transmission processing request to the communication control section 22 in specifying a blocking type or a non-blocking type. In the case of a request specifying the blocking type, the communication control section 22 performs control so as to block a new communication request until a response to the data transmission performed in response to the request is received from the access point 2. On the other hand, in the case of a request specifying the non-blocking type, the communication control section 22 does not perform the blocking control after the data transmission processing performed in response to the request. Accordingly, after the data transmission processing, even if there is no response thereto, it is possible to receive another communication request immediately. Hereinbelow, description is given of a flow of the recovery processing by separating between the case of the blocking type and the case of the non-blocking type.

Figure 4:
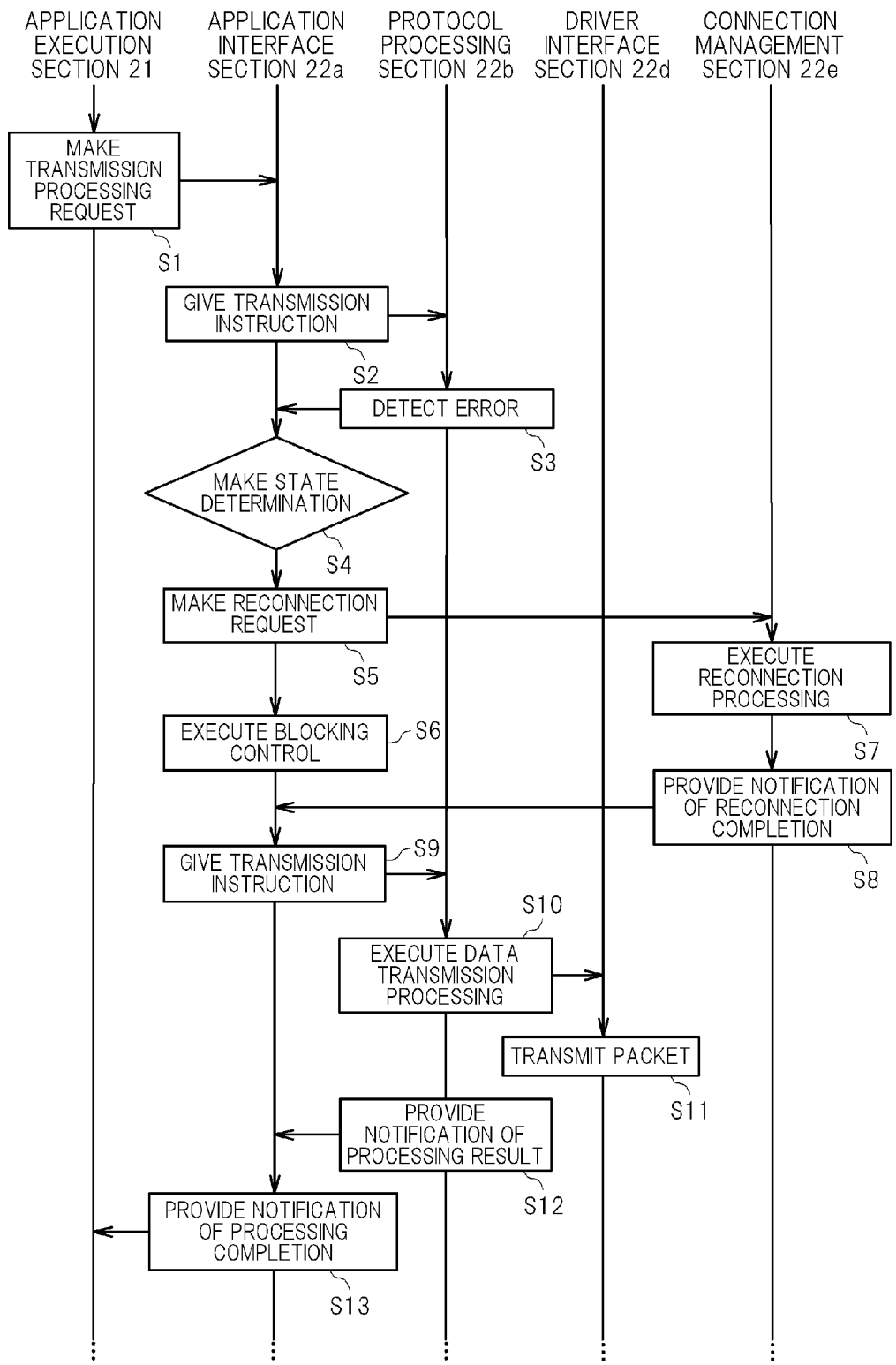
[FIG. 4] A flow chart illustrating an example of recovery processing that is executed from a communication interrupted state by the wireless communication terminal according to the embodiment of the present invention.

First, with reference to a flow chart of FIG. 4, description is given of an example of the flow of the recovery processing from the communication interrupted state St4 which is performed when a communication request specifying the blocking type has been made.

First, the application interface section 22*a* that has received the transmission processing request (S1) from the application execution section 21 instructs the protocol processing section 22*b* to execute the data transmission processing in response to the request, to thereby attempt to transmit the requested data (S2). On this occasion, if the wireless communication terminal 1 is in the connected state St3, the protocol processing section 22*b* can execute the data transmission processing without any trouble, and then can return a result thereof to the application execution section 21. Further, if the communication request from the application execution section 21 is a transmission processing request directed to a loopback address or a request relating to internal control, there is no need to perform communication with the access point 2, and hence, even in the communication interrupted state St4, the protocol processing section 22*b* completes the processing normally and returns a result thereof to the application execution section 21.

However, it is herein assumed that the request of S1 is the transmission processing request directed to the access point 2, and that the wireless communication terminal 1 is in the communication interrupted state St4. Specifically, the network address is not assigned, and thus the protocol processing section 22*b* cannot perform the data transmission to the access point 2. Accordingly, the protocol processing section 22*b* returns a return value indicating occurrence of a communication error (here, "ENETDOWN") to the application interface section 22*a* (S3).

The application interface section 22*a* that has received a notification of S3 indicating that the data transmission processing has failed refers to the state of the wireless communication terminal 1 to determine whether or not the wireless communication terminal 1 is in the communication interrupted state St4 (S4). If a current state is not the communication interrupted state St4 but the initial state St1 or the like, the application interface section 22*a* assumes that a mere communication error has occurred and returns a result of the error (specifically, the return value "ENETDOWN") to the application execution section 21 without any modification. Because the assumption is herein made that the wireless communication terminal 1 is in the communication interrupted state St4, the application interface section 22*a* makes a request for the re-establishment of the communication connection to the connection management section 22*e* in response to a result of the determination made in S4 (S5). As described above, the data transmission processing is first attempted based on the assumption that the communication connection is established, and, only in the case of a failure, it is determined whether or not the wireless communication terminal 1 is in the communication interrupted state St4. Therefore, it is possible to avoid performing determination processing when a connection is normally established or when there is no need to perform the data transmission to the access point 2.

After making a request for the reconnection, the application interface section 22a performs the blocking control so as to block the reception of the communication processing request from the application execution section 21 (S6). Unlike the blocking control performed to wait for a reply after the data transmission processing is executed normally, the blocking control performed here is such blocking control that is performed to wait for an event notification indicating the completion of the communication connection. Meanwhile, the connection management section 22e that has received the request in S5 instructs the network driver section 23 to establish a communication connection at the physical layer via the driver control section 22c. In response to the instruction, the re-establishment of the communication connection (reconnection processing) is executed, and the network address is assigned again (S7). After the re-assignment of the network address is completed, the connection management section 22e provides a notification indicating the completion to the application interface section 22a via the driver control section 22c (S8).

The application interface section 22a that has received the notification in S8 cancels the blocking control executed in S6, and then instructs again the protocol processing section 22b to perform the data transmission processing associated with the blocking control (that is, data transmission processing relating to the transmission processing request received in S1) (S9). This processing is the same as the processing performed in S2.

This time, the re-establishment of the communication connection is already completed, and hence the protocol processing section 22b can execute processing of packet generation and the data transmission normally in response to the request made in S9. Here, the transmission processing request made in S1 is the request specifying the blocking type, and hence the protocol processing section 22b executes the data transmission processing while performing the blocking control (for example, blocking control performed to wait for a transmission packet buffer to have some space) when needed (S10). With this, a packet is delivered from the driver interface section 22d to the communication unit 13 via the network driver section 23, and packet transmission is executed by the communication unit 13 (S11). After normally executing the data transmission processing to instruct the driver interface section 22d to perform the packet transmission, the protocol processing section 22b provides a notification indicating a result of the processing to the application interface section 22a (S12). In response to the notification, the application interface section 22a provides a notification indicating the completion of the data transmission processing to the application execution section 21 (S13). By executing the processing as illustrated in FIG. 4, regardless of whether the wireless communication terminal 1 is in the communication interrupted state St4 or in the connected state St3, the application execution section 21 can make the communication processing request as usual and acquire a result thereof.

Figure 5:
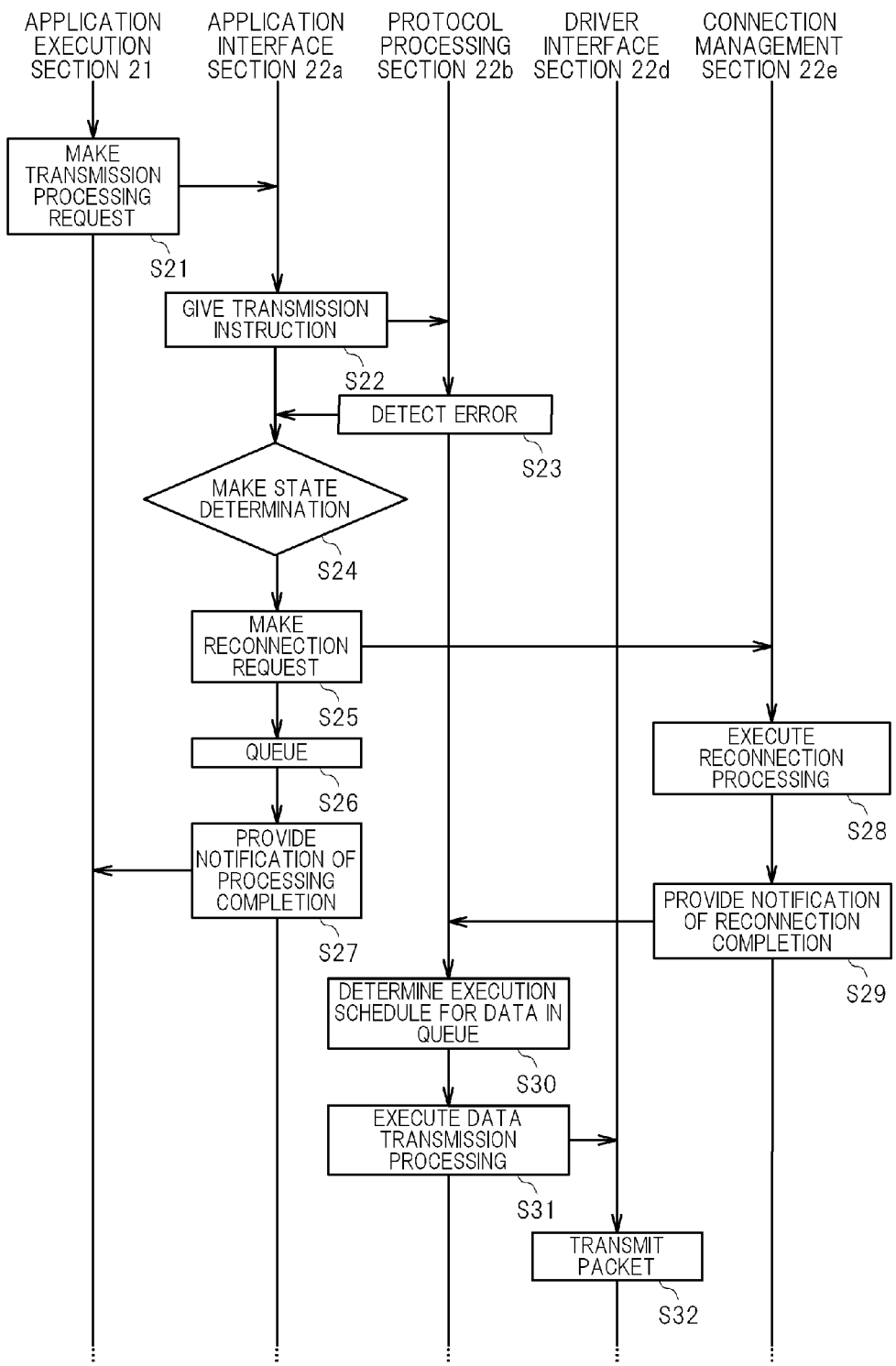
[FIG. 5] A flow chart illustrating another example of the recovery processing that is executed from the communication interrupted state by the wireless communication terminal according to the embodiment of the present invention.

Next, with reference to a flow chart of FIG. 5, description is given of an example of the flow of the recovery processing from the communication interrupted state St4 which is performed when a communication request specifying the non-blocking type has been made.

First, similarly to the case of the flow of FIG. 4, the application interface section 22a that has received the transmission processing request (S21) from the application execution section 21 instructs the protocol processing section 22b to perform the data transmission processing in response to the request (S22). Then, similarly to the case of the flow of FIG. 4, the protocol processing section 22b cannot perform the data transmission to the access point 2, and thus returns the return value indicating occurrence of a communication error (ENETDOWN) to the application interface section 22a (S23).

The application interface section 22a that has received a notification of S23 refers to the state of the wireless communication terminal 1 to determine whether or not the wireless communication terminal 1 is in the communication interrupted state St4 (S24). If the current state is not the communication interrupted state St4 but the initial state St1 or the like, the application interface section 22a assumes that a mere communication error has occurred and returns a result of the error (return value "ENETDOWN") to the application execution section 21. Because the assumption is herein made that the wireless communication terminal 1 is in the communication interrupted state St4, the application interface section 22a makes a request for the re-establishment of the communication connection to the connection management section 22e in response to a result of the determination made in S24 (S25). In the flow of FIG. 5, unlike the case of the flow of FIG. 4, the blocking control performed to wait for the completion of the communication connection is not executed. Accordingly, a new communication processing request maybe issued from the application execution section 21 while the processing for the reconnection is executed. Hence, the application interface section 22a queues, in the queue for unprocessed data prepared in the storage unit 12, information indicating the content of the transmission processing request received in S21 (argument or the like specified for the connect function or the send function) (S26). By doing so, even when the communication processing requests specifying the non-blocking type are issued continuously, those communication processing requests are queued so that pieces of unprocessed data in the queue can be processed sequentially after the communication connection is re-established to shift to the preparatory state St2.

Here, assuming that the data transmission processing has been executed normally in response to the instruction of S22 because the wireless communication terminal 1 is in the connected state St3, the protocol processing section 22b provides a notification indicating a result of the processing to the application interface section 22a, and, in response to the notification, the application interface section 22a provides, to the application execution section 21, a notification of a result indicating that the data transmission processing has been completed normally (for example, a return value "EINPROGRESS" in the case of TCP communication, and the number of bytes to be transmitted in the case of UDP communication, or the like). Accordingly, when it is determined in S24 that the wireless communication terminal 1 is in the communication interrupted state St4, too, the application interface section 22a is configured to return the same return value as when the data transmission processing has been executed normally to the application execution section 21 (S27). Specifically, despite the fact that the attempt of the protocol processing section 22b to perform the data transmission processing has failed, the application interface section 22a returns a response indicating that the transmission processing request from the application execution section 21 has been processed normally. By doing so, even in the communication interrupted state St4, the application execution section 21 can receive the response indicating that the transmission processing request has been accepted normally at a timing not so different from the timing of the case of the connected state St3.

Similarly to the case of S7 of FIG. 4, the connection management section 22e that has received the reconnection request of S25 re-establishes the communication connection and receives the re-assignment of the network address (S28). After the re-assignment of the network address is completed, the connection management section 22e provides a notification indicating the completion to the protocol processing section 22b via the driver control section 22c (S29). Note that, in the case of FIG. 4, the notification of the completion of the reconnection is provided to the application interface section 22a that is executing the blocking control (S8). However, in the example of FIG. 5, the processing performed by the application interface section 22a in response to the transmission processing request of S21 is completed with the provision of the notification of the processing result in S27, and hence the notification of the completion of the reconnection is provided to the protocol processing section 22b.

The protocol processing section 22b that has received the notification of S29 determines an execution schedule for the pieces of unprocessed data queued in S26 (S30), and, in accordance with the determined schedule, sequentially executes pieces of data transmission processing corresponding to the pieces of data in the queue (S31). In response thereto, the driver interface section 22d causes the communication unit 13 via the network driver section 23 to execute the packet transmission (S32).

Here, the protocol processing section 22b may immediately process all the pieces of unprocessed data in the queue. However, by doing so, there may occur a case where a plurality of pieces of data transmission processing requested in a temporally distributed manner by the application execution section 21 are executed continuously in a temporally clustered manner. For example, assuming that the application execution section 21 is executing a game application, if all the pieces of unprocessed data in the queue are executed immediately as in such case, as a result, the contents of the pieces of processing executed at certain intervals are reflected collectively, which thus may make the user feel a sense of strangeness. To address this, depending on the application program that is being executed by the application execution section 21, the scheduling maybe executed in such a manner that the respective pieces of unprocessed data are processed at time intervals corresponding to the time intervals at which the plurality of pieces of unprocessed data were stored in the queue.

Specifically, if the application execution section 21 has given an instruction for such control, the application interface section 22a queues, at the time of storing the unprocessed data in the queue, the unprocessed data together with timing information indicating a time point of the storing. The timing information may be such information that indicates a relative timing with respect to the time point of the storing of the preceding unprocessed data. Then, when the shift to the preparatory state St2 has been made, the protocol processing section 22b refers to the timing information, to thereby determine the timing at which each piece of the unprocessed data is executed. For example, in a case where a first piece of unprocessed data, a second piece of unprocessed data, and a third piece of unprocessed data are queued at a time t1, a time t2, and a time t3, respectively, after the completion of the reconnection, the protocol processing section 22b first executes the first piece of unprocessed data immediately, subsequently executes the second piece of unprocessed data after a lapse of a time period of (t2−t1), and further subsequently executes the third piece of unprocessed data after a lapse of a time period of (t3−t2). By doing so, after the re-establishment of the communication connection, the respective pieces of data transmission processing are executed at the time intervals corresponding to the time intervals requested by the application execution section 21, and hence it is possible to make the user feel that the network is delayed simply by a time period required for the re-establishment of the communication connection.

Further, generally, after the re-establishment of the communication connection, the data transmission processing cannot be executed unless address resolution is performed by transmitting an address resolution protocol (ARP) packet. However, depending on how the protocol processing section 22b is implemented, a packet being a target of the transmission processing may be discarded before the address resolution is completed. Accordingly, in order to prevent the second and subsequent pieces of unprocessed data from becoming a target of the processing while the address resolution is performed to transmit the first piece of unprocessed data, the schedule may be set with a delay of a typical time period required for the address resolution. Alternatively, another queue may be provided for queuing the unprocessed data while the address resolution is performed.

Here, description is given of a modification example of the determination condition used for determining whether or not to make the shift from the connected state St3 to the communication interrupted state St4.

In the description given above, when the data communication does not occur for a predetermined time period (hereinbelow, referred to as determination reference time period Tm1), the shift to the communication interrupted state St4 is executed. However, the determination reference time period Tm1 may be changed depending on the communication situation. For example, when the shift to the communication interrupted state St4 has been made, the communication control section 22 starts a timer to measure a time period until the shift is made to the recovery state St5 (communication interruption time period). Then, as a result of the measurement, when the communication interruption time period is less than a predetermined time period Tm2 (for example, 20 seconds), the determination reference time period Tm1 is changed to a value obtained by adding thereto the predetermined time period Tm2. With this, in such a situation that the reconnection is performed in a relatively short time period after the shift to the communication interrupted state St4 is made, the determination condition can be changed so that the shift to the communication interrupted state St4 is less likely to occur, which thus enables avoiding communication interruption control that does not relatively contribute to reducing the power consumption. Note that, the communication control section 22 may measure the communication interruption time period even after the determination reference time period Tm1 is changed as described above, and, when the communication interruption time period is equal to or longer than the predetermined time period Tm2, the communication control section 22 may return the determination reference time period Tm1 to the original value.

Further, in a case where the data transmission performed at fixed time intervals, such as "keep-alive", is executed via a particular socket, the communication control section 22 may determine whether or not to shift to the communication interrupted state St4 in consideration of such communication. To give a specific example, when the application execution section 21 issues a request for setting the socket (setsockopt function) to the application interface section 22a, the application execution section 21 specifies the socket as the socket for "keep-alive". The driver interface section 22d monitors the timing of data communication via the socket for "keep-alive" (keep-alive communication). Then, when it is determined that the data communication has not occurred for the determination reference time period Tm1, the driver interface section 22d identifies the timing at which the keep-alive communication is executed next. As a result of this identifying, when it is determined that the next keep-alive communication is to be executed within a predetermined time period, the driver interface section 22d determines not to make the shift to the communication interrupted state St4 immediately but to postpone the shift. Further, in this case, when there has been no data communication occurring via another socket after the determination of the postponement until the next keep-alive communication is executed, the driver interface section 22d determines to shift to the communication interrupted state St4 immediately after the execution of the keep-alive communication. By doing so, it is possible to avoid the shift to the communication interrupted state St4 when the recovery from the communication interrupted state St4 needs to be performed for the keep-alive communication after a short time period.

According to the wireless communication terminal 1 of this embodiment described above, regardless of the execution state of the application program, it is possible to temporarily disconnect the communication connection made by the communication unit 13 so as to avoid the transmission of an unnecessary control packet, which thus enables the power consumption to be reduced while the application program is not executing the data communication. Even if such control is executed, the operation of the application execution section 21 is maintained, and hence there is no need to design the application program in consideration of such disconnection of the communication connection.

Note that, the embodiment of the present invention is not limited to the description above, and various modifications may be made. For example, the communication unit 13 is not limited to the communication interface for the wireless LAN but maybe various kinds of wireless communication interfaces. To give a specific example, the above-mentioned method may be employed to execute disconnection/reconnection control of a communication connection even in a case where the communication unit 13 is a Bluetooth (registered trademark) interface, and the wireless communication terminal 1 is connected to another Bluetooth device by joining a Bluetooth personal area network.

The invention claimed is:
1. A wireless communication terminal, comprising:
an application execution section for executing an application program; and
a communication control section for transmitting data to a communication target in response to a transmission processing request from the application execution section,
wherein the communication control section comprises:
a connection section for establishing a wireless communication connection to the communication target;
a communication interruption section for disconnecting, based on a given condition, the wireless communication connection to the communication target to cause a shift to a communication interrupted state;
a reconnection section for re-establishing the wireless communication connection to the communication target when the transmission processing request is received in the communication interrupted state; and
a data transmission section for transmitting, to the communication target, the data relating to the transmission processing request after the re-establishment of the wireless communication connection.

2. The wireless communication terminal according to claim 1, wherein:
the data transmission section attempts, when the transmission processing request is received, to execute data transmission processing relating to the transmission processing request; and
the reconnection section re-establishes, when the attempted data transmission processing has failed, the wireless communication connection to the communication target.

3. The wireless communication terminal according to claim 2, wherein, when the attempted data transmission processing has failed, and the reconnection section executes the re-establishment of the wireless communication connection, the data transmission section returns a response indicating that the transmission processing request has been processed normally to the application execution section.

4. The wireless communication terminal according to claim 2, further comprising a storing section for storing, in a queue, information indicating a content of the transmission processing request received from the application execution section when the attempted data transmission processing has failed,
wherein the data transmission section transmits, after the re-establishment of the wireless communication connection is completed, the data relating to the transmission processing request to the communication target in accordance with the information stored in the queue.

5. The wireless communication terminal according to claim 4, wherein:
the storing section stores, in the queue, the information indicating the content of the transmission processing request together with timing information indicating a time point of storage into the queue; and
the data transmission section transmits, after the re-establishment of the wireless communication connection is completed, the data relating to the transmission processing request to the communication target at a timing determined in accordance with the timing information.

6. The wireless communication terminal according to claim 1, wherein, while the reconnection section is executing the re-establishment of the wireless communication connection, the data transmission section executes blocking control so as to block reception of the transmission processing request, and, after the re-establishment of the wireless communication connection is completed, cancels the blocking control to transmit the data relating to the transmission processing request.

7. A control method for a wireless communication terminal that transmits data to a communication target in response to a transmission processing request from an application execution section for executing an application program,
the control method for a wireless communication terminal comprising:
establishing a wireless communication connection to the communication target;
disconnecting, based on a given condition, the wireless communication connection to the communication target to cause a shift to a communication interrupted state;
re-establishing the wireless communication connection to the communication target when the transmission processing request is received in the communication interrupted state; and transmitting, to the communication target, the data relating to the transmission processing request after the re-establishment of the wireless communication connection.

8. A non-transitory, computer-readable information storage medium having a program stored therein, the program being used for controlling a wireless communication terminal that transmits data to a communication target in response to a transmission processing request from an application execution section for executing an application program, and causing the wireless communication terminal to function as:
- a connection section for establishing a wireless communication connection to the communication target;
- a communication interruption section for disconnecting, based on a given condition, the wireless communication connection to the communication target to cause a shift to a communication interrupted state;
- a reconnection section for re-establishing the wireless communication connection to the communication target when the transmission processing request is received in the communication interrupted state; and
- a data transmission section for transmitting, to the communication target, the data relating to the transmission processing request after the re-establishment of the wireless communication connection.

* * * * *